United States Patent [19]

Beiser

[11] 4,260,858
[45] Apr. 7, 1981

[54] VIDEODISC PLAYER WITH DRIVE MEANS ENGAGING VIDEODISC GUIDE GROOVE

[76] Inventor: Leo Beiser, 151-77 27th Ave., Flushing, N.Y. 11354

[21] Appl. No.: 918,809

[22] Filed: Jun. 26, 1978

[51] Int. Cl.³ .................. H04N 5/76; G11B 17/00
[52] U.S. Cl. ............................... 369/103; 350/3.72; 358/128.5; 369/111; 369/218
[58] Field of Search ............... 358/128, 128.5; 360/97; 179/100.3 V, 100.4 R, 100.41 L, 100.1 G; 274/13 A, 39 A; 350/3.72

[56] References Cited

U.S. PATENT DOCUMENTS

| | | | |
|---|---|---|---|
| 2,537,657 | 1/1951 | D'Humy | 274/13 A |
| 3,363,054 | 1/1968 | Mason | 279/100.3 V |
| 3,404,224 | 10/1968 | Revelo | 358/128 |
| 3,751,151 | 8/1973 | Petterson | 274/13 A |
| 3,939,302 | 2/1976 | Kihara | 179/100.3 V |
| 3,979,541 | 9/1976 | Desourdis | 360/134 |
| 3,980,818 | 9/1976 | Browning | 179/100.3 V |
| 4,133,600 | 1/1979 | Russell | 346/108 |

*Primary Examiner*—Bernard Konick
*Assistant Examiner*—Alan Faber
*Attorney, Agent, or Firm*—Martin Novack

[57] ABSTRACT

The disclosure is directed to a system for storing and reproducing analog or digital information, such as television information. There is provided a recording disk having a mechanical guiding track formed in a spiral or circular pattern on a surface thereof.

A signal recovery device is provided and includes mechanical tracking means to effect guiding along the mechanical guiding track of the disk. The signal recovery subsystem also includes an optical scanning means for scanning the optical records.

In the preferred embodiment of the invention, the signal recovery device includes mechanical driving means, synchronized with the optical scanning means, for engaging the guiding track and causing motion of the disk with respect to the signal recovery device. The disk is preferably mounted on a passive turntable, and rotation of the disk and turntable is achieved by the mechanical driving means of the signal recovery device acting directly on the disk. Since the mechanical driving means is synchronized with the optical scanning means, proper tracking is achieved, and this is done without the need for complicated servomechanisms as would be needed for precise independent direct driving of the turntable. In an embodiment of the invention, the mechanical guiding track has serrations thereon and the mechanical driving means in the signal recovery device includes a rotatable member which engages the serrations to effect motion of the recording disk.

28 Claims, 9 Drawing Figures

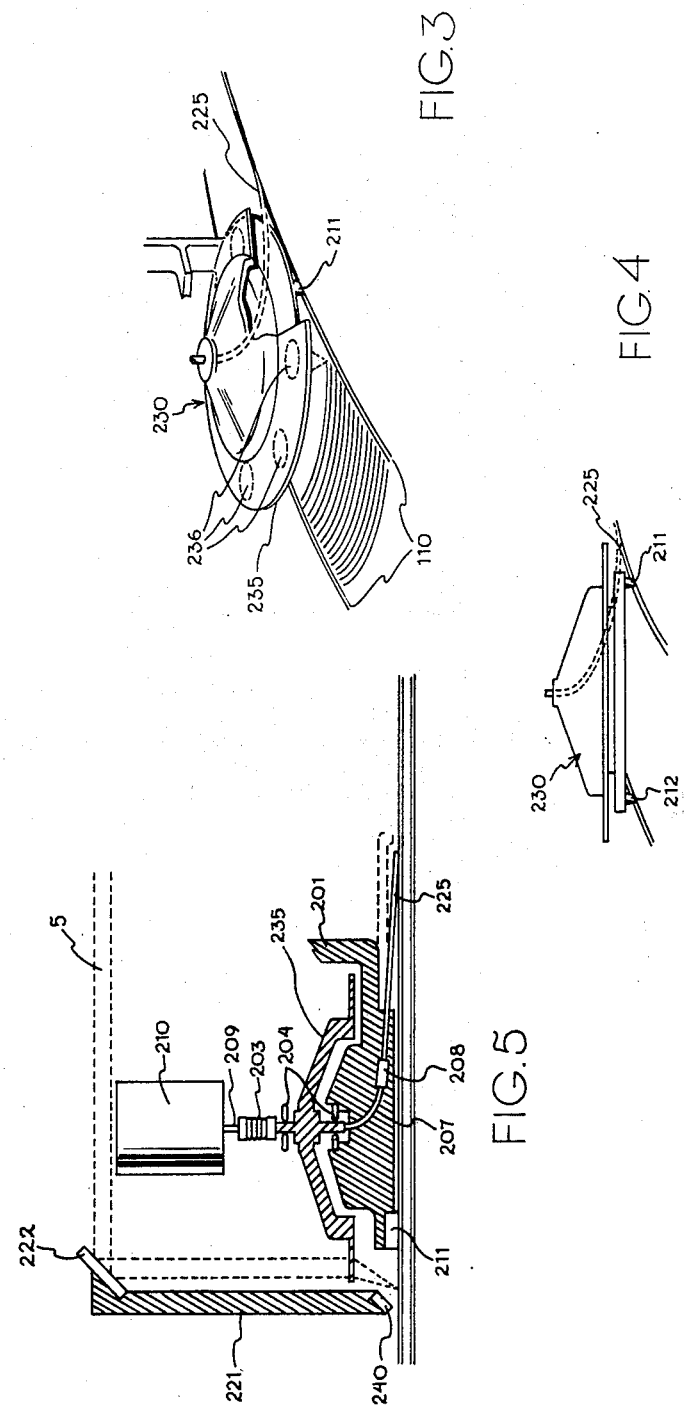

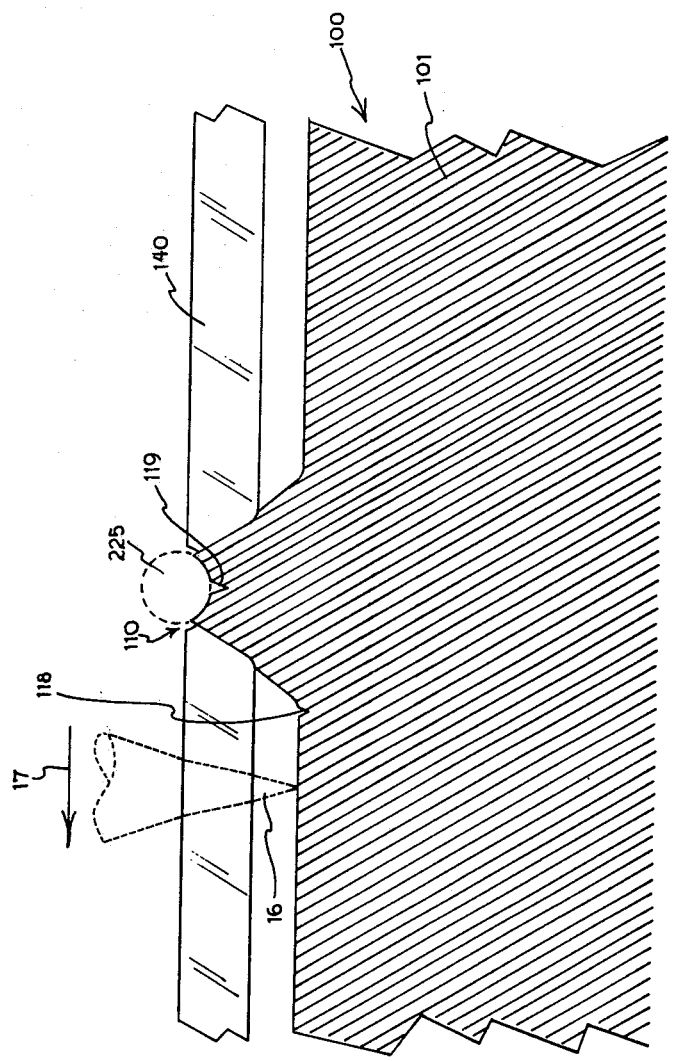

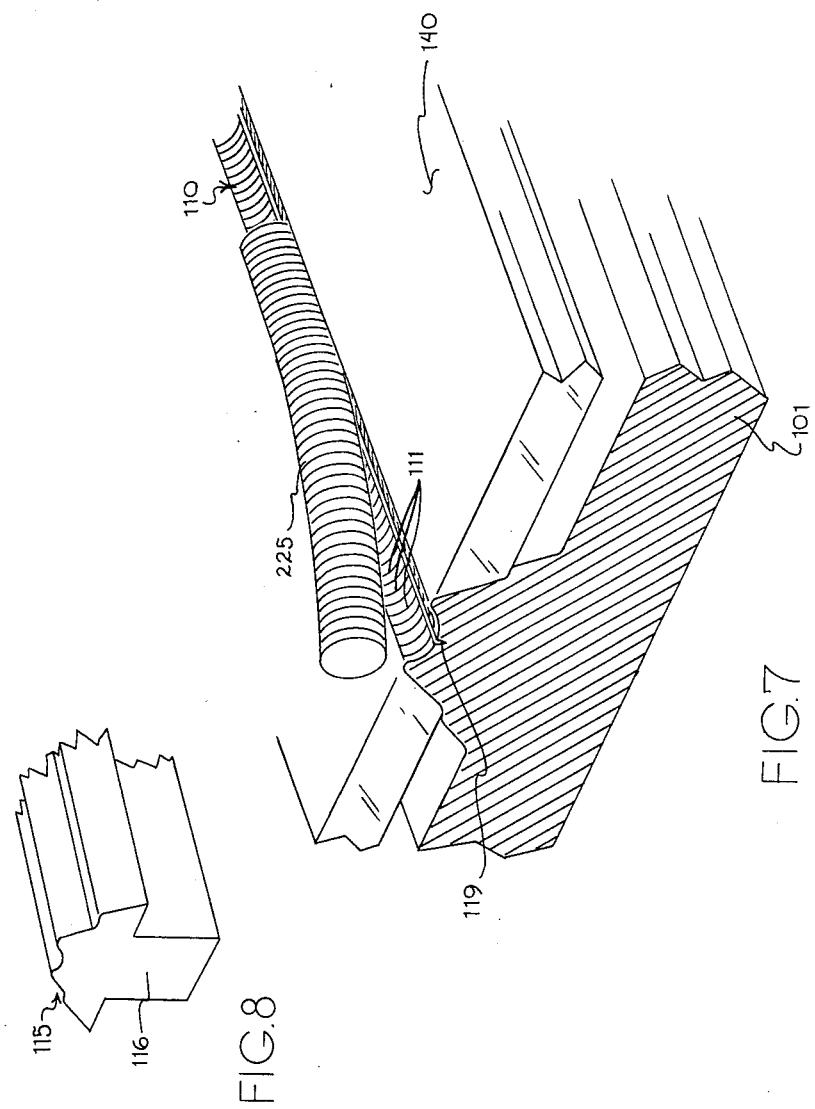

VIDEODISC PLAYER WITH DRIVE MEANS ENGAGING VIDEODISC GUIDE GROOVE

BACKGROUND OF THE INVENTION

This invention relates to apparatus and techniques for storing and reproducing information and, more particularly, to a system for storing and reproducing television information using video disks which can be replicated in relatively large quantities.

The recording of television information on storage media for use by the public has become relatively widespread in recent years with the advent of video tape recording equipment for the consumer. However, it has been recognized that existing video tape systems have drawbacks of complexity and expense which limit their appeal. The cost of the magnetic tape itself is considerable, and magnetic tape also has the drawbacks of slow access to the information stored therein and the need for rewinding the tape before it is replayed. In response to these deficiencies, various proposals have been set forth for recording television information on "video disks" which are to be played in the general manner of a phonograph recording; i.e., using a turntable and pickup device, typically mounted on a pivot arm. The video disk generally has advantages of relatively low cost, easy replication, fast access to all information thereon, and no necessity of rewind. Data can be recorded on the disk by various techniques, for example by modulation of the optical properties or of the electrical capacitance at the disk surface. The following U.S. patents illustrate representative prior art techniques:

U.S. Pat. No. 3,287,563
U.S. Pat. No. 3,501,586
U.S. Pat. No. 3,624,284
U.S. Pat. No. 3,795,902
U.S. Pat. No. 3,806,643
U.S. Pat. No. 3,939,302
U.S. Pat. No. 3,975,630
U.S. Pat. No. 4,001,494
U.S. Pat. No. 4,015,285
U.S. Pat. No. 4,021,606
U.S. Pat. No. 4,025,731

Since the information being recorded includes relatively wideband video signals, and the recording disk is of limited area, designers have struggled with the problem of compressing enough information onto the record disk to obtain a reasonably long program playing time for the disk. As the data is compressed, the tasks of precisely tracking the data regions on the disk and of recovering the information therein, give rise to further difficult problems.

In the U.S. Pat. No. 3,939,302 there is disclosed apparatus for recording and reproducing a video signal on a photographic record disk. Composite television signals are recorded in a spiral track or in a series of concentric circular tracks on a record disk. Each track consists of line sequential signals optically recorded in the radial direction on the disk with each radially oriented optical track representing one horizontal scanline of the television signal, so that successive scanlines are arranged in the circumferential direction of the track. The disk is mounted on a turntable which is precisely rotated at an "extremely low speed" while a video signal reproducing head optically follows the spiral or concentric tracks on the record. A photo-detecting assembly includes an optical shutter that operates in a manner similar to a Nipkow disk and has a number of small apertures therein arranged in a circle. The Nipkow disk is rotated at a constant speed and the turntable is rotated independently at a variable speed to account for the different data density at different disk radii. The photo-detecting assembly is moved radially with respect to the disk, either by moving the assembly itself or laterally moving the disk turntable.

While there are some advantages to the approach taken in the U.S. Pat. No. 3,939,302, a number of operational problems could stand improvement, some of which are as follows: The variable speed turntable drive is complex and expensive. Even a small error in turntable speed will cause severe problems in tracking the data. Also, the tracking of the photo-detecting assembly with respect to the spiral or concentric data track is of an indirect nature and can introduce errors and inherent unreliability. Further, only a single television scanline is disposed on each data track, thereby requiring a relatively high optical scanner speed. In this regard, the relatively low illumination efficiency of the tiny apertures of the Nipkow disk, in conjunction with the required relatively fast scan, limits the signal level which will be achievable using this scheme.

It is an object of the present invention to provide a system which overcomes problems of the prior art as set forth, and further provides a generally improved technique of data disk recording and reproducing.

SUMMARY OF THE INVENTION

The present invention is directed to a system for storing and reproducing television information. As defined herein, television information is intended to broadly mean video information of any format with or without accompanying audio information. In accordance with the invention, there is provided a recording disk having a mechanical guiding track formed in a spiral or circular pattern on a surface thereof. A multiplicity of relatively closely spaced elongated optical records are formed in the disk in the regions between the guiding track and generally transverse the guiding track. These optical records, which are preferably or arcuate shape, contain recorded television information. Preferably, each of the optical records includes the information for a plurality of television scanlines. A signal recovery device is provided and includes mechanical tracking means to effect guiding along the mechanical guiding track of the disk. The signal recovery subsystem also includes an optical scanning means for scanning the optical records. The optical scanning means is operative to successively scan the optical records as the signal recovery device moves with respect to the guiding track. The signal recovery device further includes means responsive to the optical scanning means for recovering electronic television information contained in the scanned optical records. This recovery of the information in the optical records is preferably achieved utilizing photodetector means which produce an electronic signal that represents the television information. This electronic signal can then be processed to obtain a television signal of whatever format is required.

In the preferred embodiment of the invention, the signal recovery device includes mechanical driving means, synchronized with the optical scanning means, for engaging the guiding track and causing motion of the disk with respect to the signal recovery device. The disk is preferably mounted on a passive turntable, and rotation of the disk and turntable is achieved by the mechanical driving means of the signal recovery device acting directly on the disk. Since the mechanical driving means is synchronized with the optical scanning means, proper tracking is achieved, and this is done without the need for complicated servomechanisms as would be needed for precise direct driving of the turntable. In an embodiment of the invention, the mechanical guiding track has serrations therein and the mechanical driving means in the signal recovery device includes a rotatable member which engages the serrations to effect motion of the recording disk. In this embodiment, the optical scanning means includes means for directing a light beam toward the optical records and further includes a plurality of lenses mounted in a rotatable scanning assembly. The lenses are adapted to move successively through the path of the light beam to effect scanning of the beam over an optical data record as the rotatable scanning assembly is rotated in synchronism with the mechanical driving means. The mechanical driving and optical scanning operations are thereby closely coordinated so that accurate following of the data is insured. Further, and as will be described hereinbelow, the fabrication of the master, from which video disks are ultimately replicated, is performed utilizing the same relationship between mechanical tracking and optical scanning that is used during playback. In this manner, proper tracking is insured during playback of the disk facsimiles.

Further features and advantages of the invention will become more readily apparent from the following detailed description when taken in conjunction with the accompanying drawings.

BRIEF DESCRIPTION OF THE DRAWINGS

FIG. 3 is an elevational perspective view, partially broken away, of a portion of the scanner head assembly of the system of FIG. 1, shown as scanning optical records between adjacent guide tracks of the recording disk of FIG. 1.

FIG. 4 is a front sectional view of the portion of the scanner head assembly shown in FIG. 3.

FIG. 5 is a side sectional view of the scanner head assembly shown in the FIG. 1 system.

FIG. 6 is an enlarged sectional view of a small portion of the recording disk, the view illustrating a single mechanical guiding track and adjacent regions which contain optical data records, the section being perpendicular to the direction of mechanical guiding.

FIG. 7 is a side elevational perspective view of the section of FIG. 6, and also shows the drive helix of the scanner head assembly engaging the mechanical guiding track.

FIG. 8 illustrates a cross section of the mechanical guide track ribbon which can be utilized in fabricating the recording disk of the FIG. 1 system.

DESCRIPTION OF THE PREFERRED EMBODIMENT

Figure 1:
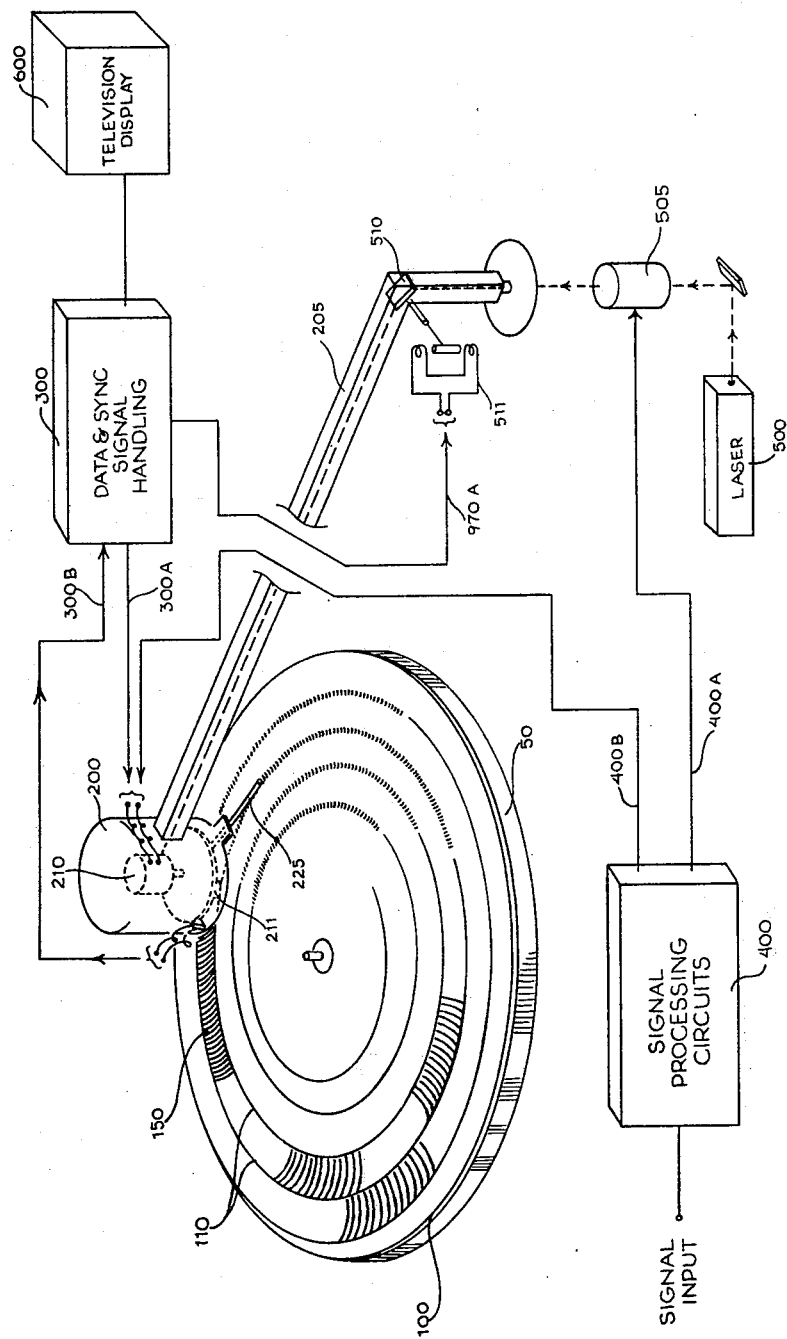
FIG. 1 is a schematic diagram, partially in block form, of an information recording and reproducing system in accordance with the invention.

Referring to FIG. 1, there is shown a schematic representation of an electronic data recording and reproducing system 10 in accordance with an embodiment of the invention. A recording disk 100 is mountable on a turntable 50 which, in the present embodiment, is passive, but is free to rotate on its axis. Recording disk 100 has a continuous mechanical guiding track 110 formed on the surface thereof. As used herein, the term "mechanical" guiding track is intended to mean a track wherein guiding is effected as a function of mechanical relationships (as compared, for example, to electrical or optical guiding). The mechanical guiding track 110 is preferably a continuous spiral groove in the surface of recording disk 100, but may alternatively be in the form of concentric circular grooves. A multiplicity of relatively closely spaced elongated optical records or data tracks 150 are formed in the surface of disk 100 in the regions between the guiding track. These optical records include the stored information, in the form of optical modulations on the disk surface, as will be described further hereinbelow.

A signal recovery device 200, also referred to as a scanner head assembly 200, is mounted on a pivot arm 205. Electronic processing circuitry 300 and 400 and optical components 500, 505 and 510 operate in conjunction therewith. The scanner head assembly 200 includes mechanical tracking means by which the scanner head assembly 200 guides itself along the guiding track 110. In the present embodiment, the mechanical tracking means includes a pair of styli 211 and 212 (e.g. FIG. 4) and a drive helix 225, each of which engages the spiral guiding track 110. The scanner head assembly 200 also includes an optical scanner 230 (e.g. FIG. 2) which is operative to scan successivdly adjacent optical data records 150 as the scanner head assembly 200 moves with respect to the guiding track 110 on the record surface. As will be described, the optical scanning assembly includes means for scanning a light beam, in this case a laser beam from a laser 500, along the optical data records 150 so that the light reflected therefrom is modulated in accordance with the recorded information. Photodetectors then convert the modulated light beam to electronic signals. These signals are coupled to data and sync signal circuitry (block 300) for processing to obtain signals in a format which can be employed to drive a data utilization or presentation device, such as television display 600.

The block 300 also includes circuits for generating control signals which control a drive motor 210 in scanner head assembly 200 and, if desired, an optional line position deflector 511 which drives mirror 510 and can be utilized to make fine adjustment of the beam position. In accordance with a feature of the present embodiment of the invention, the motor 210 is used to drive both the optical scanner 230 and the drive helix 225. The drive helix 225 engages serrations in the track 110, and rotation of the drive helix causes the recording disk 100 and passive turntable 50 to rotate. Rotation of disk 100 is therefore in synchronism with the optical scan, since the optical scan motion and the drive helix motion derive from the same source (motor 210). As the disk 100 rotates, and scanner head assembly 200 follows the track 110 in the disk surface, the scanner head assembly moves slowly (on pivot arm 205) toward the center of the disk 100. If desired, movement may alternatively be outward away from the center of the disk.

Generalized operation of the data disk system, during "playback" mode is as follows: Action of the drive motor 210 on the drive helix 225 causes the rotation of disk 100 as the scanner head assembly 200 tracks the grooves 110 in the disk surface. Rotation of the motor 210 also causes the optical scanner 230 of scanner head assembly 200 to scan successively adjacent optical records 150 as the disk moves with respect to the scanner head assembly 200. The laser beam 5 from laser 500 is reflected from mirror 510 substantially parallel to the pivot arm 205 (which may serve as a light pipe) and is directed toward the optical scanner 230 in the scanner head assembly 200. Optical scanning is achieved using the motor 210 to drive a scanner disk 235 of optical scanner 230. The laser beam 5, which passes through successive lenses 236 mounted in the scanner disk 235, is scanned across an optical record 150. The lenses are preferably holographically formed. The scan rate is controlled by a signal 300A from the data and sync signal circuitry 300. The beam reflected from the optical record being scanned is received by detector 240 which is mounted in the front of scanner head assembly 200. The detector 240 may comprise one or, preferably, a plurality of solid state photodetectors which generate electrical signals that are coupled to data and sync signal circuitry via lines 300B. As scanning is continuously effected, the drive helix advances the disk with respect to the scanner head assembly so that successive optical records are scanned. Signals processed by the circuitry 300 are coupled to the utilization or presentation equipment 600. During a recording mode (to be described further hereinbelow), the laser beam 5 is modulated with information in suitable form, as obtained using signal processing circuitry 400 to control light modulator 505 via line 400A. The motor 210 in scanner head assembly 200 is synchronized with the signal being recorded, for example a television signal, as indicated by line 400B.

Referring to FIGS. 2, 3, 4 and 5, there are shown various views of the scanner head assembly 200. This assembly is mounted on a fork-like frame 201 that is formed at the end of pivot arm 205. The top prong of the frame 201 terminates in an annular ring 202 which receives the drive motor 210. The shaft 209 of drive motor 210 passes through a shaft coupling 203 which is mounted at the end of the center prong of the frame 201. Below this shaft coupling, disk 235 is mounted on the shaft and bearings 204 are positioned above and below the disk 235. Below the disk 235 a section of flexible drive wire 207 is coupled to the end of extended shaft 209 (as extended through coupler 203). The other end of flexible drive wire 207 is attached to a coupling element 208 which, in turn, is attached to a semi-rigid drive wire that has a drive helix 225 at the end thereof. It will be understood that alternate techniques of precision transfer of rotary mechanical motion can be employed.

The base member of frame 201 has a pair of guiding styli 211 and 212 on opposite sides thereof, as seen, for example, in FIG. 4 (a single stylus being visible in other views). These styli engage adjacent grooves 110 and provide stability of the scanner head assembly 200 as the disk 100 moves with respect to it. Each stylus is preferably oblong in shape and composed of relatively resilient material, e.g. Delrin, to integrate minute variations along the track. The pair of tracking styli straddles a pair of grooves on the disk and serves to integrate the radial position, the height (which affects focus), and the parallelism of the scanner head assembly with respect to the disk 100.

Figure 2:
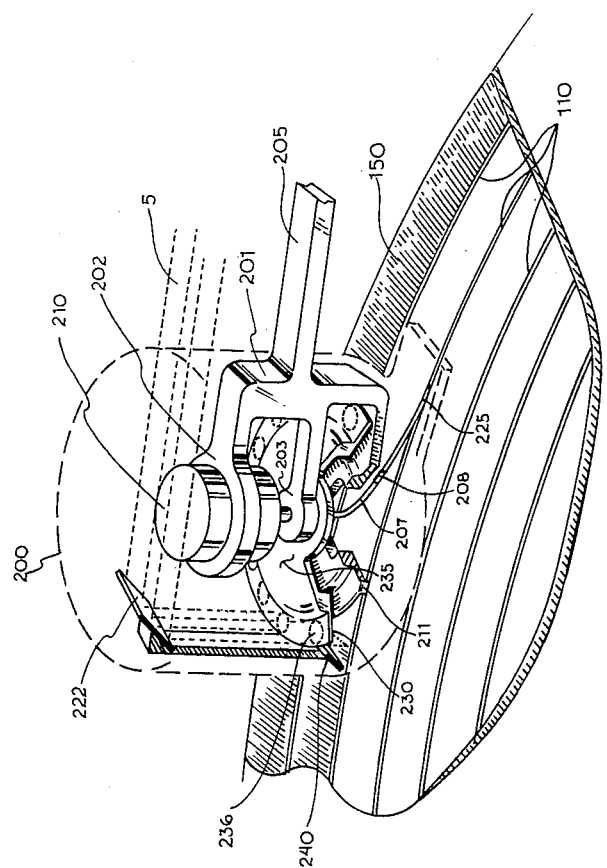
FIG. 2 is an elevational perspective view of the scanner head assembly and a portion of the recording disk of the system of FIG. 1.

Mounted on the frame 201 is a post 221 having a stationary mirror 222 fastened to the top thereof, as seen in FIGS. 2 and 5. The laser beam 5 reflects off mirror 222 and is directed toward the scanning disk 235. As seen in FIGS. 2 and 3, the disk 235 has a number of small holographically generated lenses or "hololenses" 236 disposed in evenly spaced fashion around the periphery thereof. As is known in the art, and described for example, by Leo Beiser in "Holofacet Laser Scanning", Proceedings of 1973 Electro-Optical Systems Design Conference, pp. 75–81, Kiver Publications, the movement of a hololens which is in the region below the laser beam will tend to move the focus of the beam in the direction of motion of the hololens. In this manner, a scanning light spot 16 (FIG. 6) is scanned along the optical record 100. At the completion of the scan of each optical data record 150, the adjacent hololens begins its scan of the beam along the next optical data record. The pitch of the drive helix is coordinated with the rotation of the scanning disk 235 such that the video disk 100 advances by a distance equal to the lateral separation between optical records in coordination with the traversal by one hololens through the scanning region. In the present application, the use of hololenses allows achievement of greater speed, resolution, packing density, and recording time efficiency as compared to a situation where conventional lenslets are employed.

FIGS. 6 and 7 illustrate greatly enlarged portions of the video disk 100, and show a single track 110 engaged by the drive helix 225. The disk substrate 101, typically formed of pressed vinyl, has a raised guide track 110 formed thereon. The guide track is preferably of plastic material which is fused to the disk substrate. The guide track 110 has a groove formed at the top thereof, the groove having serrations 111 which are precisely matched to the threading of the drive helix 225. The optical data records 150 are recorded in the regions between grooves and are preferably, although not necessarily, in the form of depressions in the surface of the substrate 101. A thin film of a suitable metal may be applied over the vinyl surface to render it reflective. The depth modulation of the optical data track varies the reflective angle of the surface along each of the optical data tracks. Accordingly, the degree to which the scanning light spot 16 is reflected during its scan (as illustrated by the light cone in FIG. 6 being scanned in the direction of arrow 17) is determinative of the instantaneous recorded signal level. The signal level is detected by photodetector 240 (FIG. 5). It will be understood that various types of digital or analog optical coding can be used in recording and then decoding the optical data records, and the present invention is not limited to any particular type of code. Accordingly, any suitable coding scheme for employing the composite television information can be utilized; for example, the types of coding schemes generally set forth in U.S. Pat. Nos. 3,939,302; 3,795,902 or 4,001,494. The regions containing the optical data records 125 are preferably protected by a transparent dust shield 140 which may be formed of a transparent rigid plastic and rests on a shoulder formed in the guide track 110.

The manner in which the video disk 100 of the present invention can be produced, in relatively large quantities, will now be described. A blank flat master disk is initially provided with a center hole and is grooved, for example approximately 1 mm deep and 0.5 mm wide, in a spiral pattern corresponding to the pattern on which the raised guiding tracks 110 are to ultimately be formed. A guide track master 115 is wire-drawn from a stable and machinable material, for example brass, to exhibit the requisite generally triangular cross section, and a downwardly extending central rail 116, as illustrated in FIG. 8. The guide track master is mated with the groove formed in the disk master by pressing the rail 116 into the groove. The guide track is thus bonded to the master disk. A tap, preferably fabricated of tool steel, is utilized to form the serrations in the groove of the guide track master 115. The tap is preferably a case-hardened replica of the drive helix 225. The master disk is mounted on a passive turntable and the tap is mated tangentially into the groove or saddle at the top of master guide track 115, under pressure, and rotated to form the serrations or teeth in the track groove. Rotation of the tap causes the master disk and the turntable to rotate slowly as the serrations or teeth are cut. The master disk is originally provided with an optically flat surface, and with this surface as a reference, the groove at the top of master track 115 is engraved to a precise depth with respect to the substrate surface. The result is a reference groove 119 which is a very accurate distance above optical surface, and this establishes a precise focal height of the optical scan head which is to be utilized hereafter. This focal height is achieved by having the styli 211 and 212 ride in reference groove 119 during recording and playback. A spiralling synchronizing groove 118 is also engraved at the "start" edge of the region between the tracks. A photosensitive film, such as photoresist, is next deposited upon the flat surface of the disk. The disk is then mounted on a turntable, as in FIG. 1. As previously described, the activation of the motor in the scanner head causes the disk to rotate slowly upon the turntable, and the recording head follows the pre-grooved tracks on the disk, positioning, thereby, the scanner head assembly to construct the desired scan lines across the data track. During the recording mode, the laser beam 5 is modulated with information generated by the signal processing circuitry 400 (FIG. 1) to control light modulator 505 via line 400A. The motor 210 in scanner head assembly 200 is synchronized with the signal being recorded, for example a television signal, as indicated by line 400B. The laser light beam is caused, thereby, to be positioned across and focused upon the surface of the presensitized disk, exposing a series of transitions in accordance with the encoded data bit stream. The series of radial lines fills-in the spiralling ribbon of space with data as the disk rotates slowly beneath the scanner head assembly with the styli 211 and 212 riding in reference groove 119.

The exposed master disk is processed, in a manner known in the art, to form a series of tiny voids in the emulsion, corresponding to the bit distribution contained in the original signal. A conventional "mother-stamper" production arrangement can then be employed to form quantities of replicas of the master disk. Each replica is then surfaced to be highly reflective. A protective clear plastic (e.g. an acrylic) spiral-shaped cover (140—FIG. 6 or M) can then be added as a dust shield.

The data and synchronization signal handling will now be described. Synchronization of the beam position (recording or read-out) with the data signal is facilitated by the pre-fabricated synchronization groove 118 (FIG. 6) adjacent to the guide track which spirals from outside to inside on the disk surface. Upon traversing the synchronizing groove, the light beam is scattered and sensed by the light detectors 240 (FIG. 5) positioned adjacent to the light scan track, signalling the precise time of traversal of the focal point across the sync groove. This detected timing pulse, along with the periodicity of the encoded data which is generally a frequency multiple of the sync pulse rate, form the signals which establish synchronization in recording and read-out, as will be described further.

Figure 9:
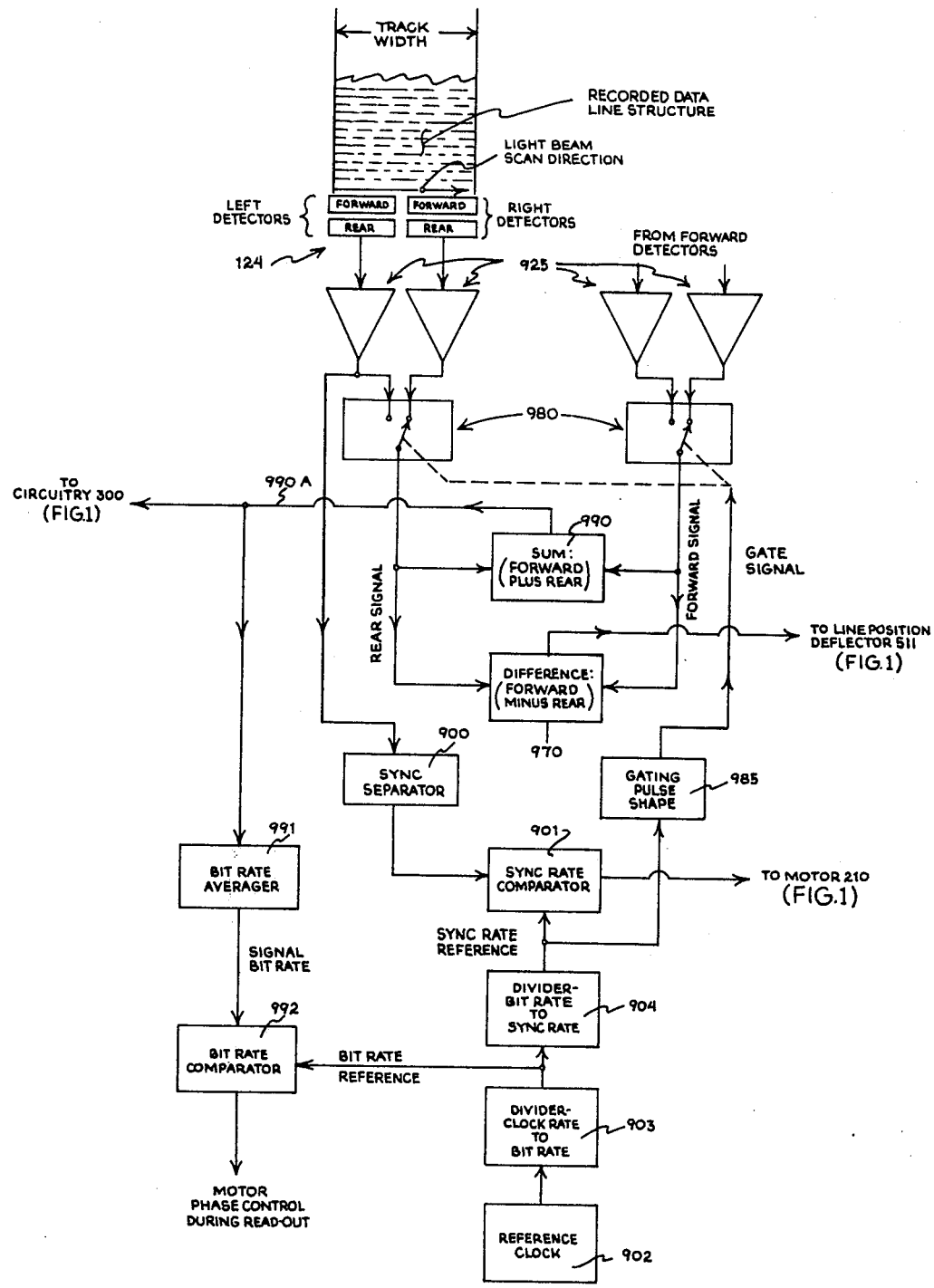
FIG. 9 is a block diagram useful in describing the data and sync handling circuitry.

During recording, the state of each track scan is synchronized in time with a sub-multiple of the data bit rate. If, for example, 15,000 bits are to be disposed on one track width during one scan, then each succeeding scan need start at a reference phase location on the substrate at multiples of 15,000 bits. This periodicity is established by the synchronization groove 118 embossed on the master disk, at a location just prior to the data region. Upon traversal by the focused light beam, its scatter is detected as an independent sync signal. Referring to the block diagram of FIG. 9 which details the circuitry 300 of FIG. 1, left forward and left rear and right forward and right rear detectors (all 124), along with preamps (all 925) are provided. The sync groove, located adjacent to the left detectors, provides a strong signal into the left channel. This signal is separated from background by sync separator 900 and compared in sync rate comparator 901 against a sync rate reference derived (using dividers 903 and 904) from a master reference clock 902 to provide a motor control signal for synchronization of the scanner motor 210 (FIG. 5) and its directly-coupled scan disk to the track structure on the master disk.

During data read-out, not only must the motor speed maintain bit synchronism, but its phase may additionally need to be restored to the same relationship which existed during recording. This develops, for example, when the encoded data contains periodic groups of signals such as TV scan lines, requiring the start of read-out scan to synchronize to the TV line periodicity or to the scan line periodicity. This line synchronization procedure utilizes the same detection channel employed during recording to restore motor phase to the divided-down reference signal at the start of each scan line.

To maintain bit synchronism during the balance of the read-out cycle (to negate short-term motor or record errors) an additional short-term motor speed control system is employed. The detected data signal (the useful output of the read-out process) appears on line 990A, as a result of signal handling logic to be subsequently described. This data signal is typically composed of a digitized bit stream having a unique periodicity. It is conveyed from line 990A through a bit rate averager 991 which is a circuit tuned to the fundamental bit rate and having a circuit Q which is low enough to follow the instrumental errors which would result if no correction were instituted. It is then compared, in the bit rate comparator 992, with a bit rate reference obtained by dividing the reference clock signal down to the bit rate using divider 903. The output of comparator 992 is an error signal which provides motor phase control during read-out, to maintain bit synchronism during the entire scan track.

The amount of signal handling logic required is a function of the type of signal recorded. If the recorded signal includes a synchronization or "blanking" interval, then the detected sync pulse resulting from the light scan traversing the pre-inscribed sync groove 118 in the record can be inserted therein, without interference with the encoded bit stream, and no special signal processing is required. This is typified by a TV-type recording having a horizontal blanking interval allotted for synchronization and "retrace". In this case, a continuous detector may be disposed across the entire scan track, accepign scatter from the sync groove as well as from the encoded bits. If, however, the recorded signal has allocated no arbitrary interval to the synchronization pulse, extra data handling may be provided which allows separation of the sync pulse from the balance of the data stream without sacrifice of any fraction of the data interval. This may be accomplished, for example, by allocating the scattered light to a "left-right" split detector, as in FIG. 9. In such case, the left detector of detectors 124 views the portion including the sync pulse; the right detector views the portion excluding the sync pulse. When the scanning light traverses the left side, the signal from the left side is passed along through a gate 980, and when the light scans the right side, the signal from the right detectors is selected by gate 980. The gate 980 is under control of a signal from a gating pulse shaper 985 which is, in turn, synchronized at the sync reference rate. Thus, in this instance, the sync pulse which would normally appear just prior the data stream of each scan is replaced with the data from the right detector, reconstituting the entire bit stream without the sync pulse. It will be understood that the type of operation just described is optional, and those blocks used in implementing this option may be deleted from those systems which provide for a sync interval. Further, if desired the left-right split of FIG. 9 may be implemented by continuous strip, requiring only one set of preamplifiers for the "forward-rear" logic to now be described:

The forward-rear detectors respond to preferential forward or rear scatter form the sampled bits; a situation which arises when the scanning light beam fails to follow the nominal center of the data track. The amplitude and polarity of this error is derived from a difference circuit 990 to form a line follow control signal on line 970A. This signal actuates the incremental light beam deflector (511—FIG. 1) in the optical path to return the scanned light beam to a nominal path. Because of the self-tracking feature of this system, in which the scanner and data disk drive are locally coupled from a common prime mover, the line following signal will exhibit a relatively slow variation with time, representing the residue of mistracking resulting from manufacturing and temporal inconsistencies of the scanner, drive assembly and data disk.

The invention has been described with reference to a particular embodiment, but variations within the spirit and scope of the invention will occur to those skilled in the art. For example, while the described embodiment has been set forth in terms of the preferred spiral track configuration, it will be understood that concentric circular tracks can be employed, although this may require that the scanner head assembly move from track to track after completion of each circular track. Further, while the described embodiment is set forth in terms of a reflection mode of operation, it will be understood that a transmission mode could alternately be employed. Still further, although the expressed technique is represented in terms of a "read only" type of memory, the adaptation of such reversible storage media as photoplastics and photodichroics allows both the recording and readout of data by a user, similar to that achieved using magnetic storage media. The advantages of the present type of system in such case, however, are the achievement of a higher packing density and a completely non-destructive (non-contacting) readout. Finally, although some of the description herein relates to television video, it will be understood that the disclosed system is sufficiently flexible to adapt to a general storage and retrieval function, retaining bit-for-bit integrity of an original continuous signal to a rate as high as about 50 megabits per second.

I claim:

1. A system for storing and reproducing information, comprising:
   a passive turntable;
   a recording disk mountable on said turntable and having a mechanical guiding track formed in a spiral or circular pattern on a surface thereof, said guiding track having serrations therein;
   a multiplicity of relatively closely spaced elongated optical records, containing said information, being formed in said disk in the regions between said guiding track and generally transverse said guiding track;
   a pivot arm;
   a signal recovery device mounted on said pivot arm, said signal recovery device including mechanical tracking means for guiding said device along said guiding track, optical scanning means for scanning the optical records, said optical scanning means being operative to scan successively said optical records as said device moves with respect to said guiding track, mechanical driving means, synchronized with said optical scanning means, and including a rotatable member which engages the serrations of said guiding track to cause motion of said disk with respect to said signal recovery device so that said signal recovery device is moved relatively slowly toward the center of said disk as said disk is rotated by said mechanical driving means; and
   means responsive to said optical scanning means for recovering the information contained in said scanned optical records.

2. The system as defined by claim 1 wherein said optical scanning means comprises means for directing a light beam toward said optical records, and a plurality of lenses mounted in a rotatable scanning assembly, said lenses being adapted to move successively through the path of said light beam as said rotatable scanning assembly is rotated in synchronism with said mechanical driving means.

3. The system as defined by claim 2 wherein said lenses are holographic lenses.

4. The system as defined in claim 2 wherein said means for recovering said information includes photodetector means in said signal recovery device for receiving light scanned over said optical record.

5. The system as defined by claim 2 wherein said tracking means includes a pair of styli which engage adjacent groove portions on said disk.

6. The system as defined by claim 1 wherein said information is television information.

7. The system as defined by claim 6 wherein the television information stored in said optical records is in the form of frames of scanlines, and wherein each of said optical records includes video information for a plurality of scanlines.

8. The system as defined by claim 2 wherein the information stored in said optical records is television information in the form of frames of scanlines, and wherein each of said optical records includes video information for a plurality of scanlines.

9. The system as defined by claim 8 wherein said tracking means includes a pair of styli which engage adjacent groove portions on said disk.

10. The system as defined by claim 1 wherein said tracking means includes a pair of styli which engage adjacent groove portions on said disk.

11. A system for storing and reproducing information, comprising:
- a recording disk having a mechanical guiding track formed in a spiral or circular pattern on a surface thereof;
- a multiplicity of relatively closely spaced elongated optical records, containing said information, being formed in said disk in the regions between said guiding track and generally transverse said guiding track; and
- a signal recovery device including mechanical tracking means for guiding said device along said guiding track, optical scanning means for scanning the optical records, said optical scanning means being operative to scan successively said optical records as said device moves with respect to said guiding track, mechanical driving means, synchronized with said optical scanning means, for engaging said guiding track and causing motion of said disk with respect to said signal recovery device, said optical scanning means including means for directing a light beam toward said optical records, and a plurality of holographic lenses mounted in a rotatable scanning assembly, said lenses being adapted to move successively through the path of said light beam as said rotatable scanning assembly is rotated in synchronism with said mechanical driving means; and
- means responsive to said optical scanning means for recovering the information contained in said scanned optical records.

12. The system as defined by claim 11 wherein said means for recovering said information includes photodetector means in said signal recovery device for receiving light scanned over said optical record.

13. The system as defined by claim 12 wherein said information is television information.

14. The system as defined by claim 13 wherein the television information stored in said optical records is in the form of frames of scanlines, and wherein each of said optical records includes video information for a plurality of scanlines.

15. The system as defined by claim 12 wherein the information stored in said optical records is television information in the form of frames of scanlines, and wherein each of said optical records includes video information for a plurality of scanlines.

16. The system as defined by claim 11 wherein said tracking means includes a pair of styli which engage adjacent groove portions on said disk.

17. The system as defined by claim 11 wherein said information is television information.

18. The system as defined by claim 11 wherein said tracking means includes a pair of styli which engage adjacent groove portions on said disk.

19. For use in a television system which utilizes a passive turntable and a recording disk mountable on said turntable and having a mechanical guiding track formed in a spiral or circular pattern on a surface thereof, said guiding track having serrations therein, said disk having a multiplicity of relatively closely spaced elongated optical records, containing television information, formed thereon in the regions between said guiding track and generally transverse said guiding track; a signal recovery device, mounted on a pivot arm, for reproducing electronic signals representative of said television information, comprising:
- mechanical tracking means for guiding said device along said guiding track;
- optical scanning means for scanning the optical records, said optical scanning means being operative to scan successively said optical records as said device moves with respect to said guiding track;
- mechanical driving means, synchronized with said optical scanning means, and including a rotatable member which engages the serrations of said guiding track to cause motion of said disk with respect to said signal recovery device so that said signal recovery device is moved relatively slowly toward the center of said disk as said disc is rotated by said mechanical driving means; and
- means responsive to said optical scanning means for recovering television information contained in said scanned optical records.

20. The device as defined by claim 19 wherein said optical scanning means comprises means for directing a light beam toward said optical records, and a plurality of lenses mounted in a rotatable scanning assembly, said lenses being adapted to move successively through the path of said light beam as said rotatable scanning assembly is rotated in synchronism with said mechanical driving means.

21. The device as defined by claim 20 wherein said lenses are holographically generated lenses.

22. The device as defined by claim 20 wherein said tracking means includes a pair of styli which engage adjacent groove portions on said disk.

23. The device as defined by claim 19 wherein said means for recovering the television information comprises photodetector means for receiving light scanned over said optical record.

24. The device as defined by claim 19 wherein said tracking means includes a pair of styli which engage adjacent groove portions on said disk.

25. For use in a television system which utilizes a recording disk having a mechanical guiding track formed in a spiral or circular pattern on a surface thereof, said disk having a multiplicity of relatively closely spaced elongated optical records, containing television information, formed thereon in the regions between said guiding track and generally transverse said guiding track; a signal recovery device for reproducing electronic signals representative of said television information, comprising:
- mechanical tracking means for guiding said device along said guiding track;
- optical scanning means for scanning the optical records, said optical scanning means being operative to scan successively said optical records as said device moves with respect to said guiding track;
- mechanical driving means, synchronized with said optical scanning means, for engaging said guiding track and causing motion of said disk with respect to said signal recovery device;
- said optical scanning means comprising means for directing a light beam toward said optical records, and a plurality of holographic lenses mounted in a rotatable scanning assembly, said lenses being adapted to move successively through the path of said light beam as said rotatable scanning assembly is rotated in synchronism with said mechanical driving means; and means responsive to said optical scanning means for recovering television information contained in said scanned optical records.

26. The device as defined by claim 25 wherein said means for recovering the television information comprises photodetector means for receiving light scanned over said optical record.

27. The device as defined by claim 26 wherein said tracking means includes a pair of styli which engage adjacent groove portions on said disk.

28. The device as defined by claim 25 wherein said tracking means includes a pair of styli which engage adjacent groove portions on said disk.

* * * * *